United States Patent [19]

Opresko

[11] Patent Number: 4,894,007
[45] Date of Patent: Jan. 16, 1990

[54] APPARATUS FOR PROVIDING FLUID TO A ROTATABLE MEMBER

[75] Inventor: Stephen T. Opresko, Lancaster, Pa.

[73] Assignee: Thomson Consumer Electronics, Princeton, N.J.

[21] Appl. No.: 283,442

[22] Filed: Dec. 12, 1988

[51] Int. Cl.⁴ .............................................. F23D 11/04
[52] U.S. Cl. .................................. 431/168; 126/39 E; 239/214.25
[58] Field of Search ................ 126/39 E; 239/214.25, 239/265.37, 700, 127.1, 251, 265.11; 277/80, 135; 431/165, 168

[56] References Cited

U.S. PATENT DOCUMENTS

| | | | |
|---|---|---|---|
| 2,987,153 | 6/1961 | Perry | 277/80 X |
| 4,087,234 | 5/1978 | Delyannis | 431/168 |
| 4,165,227 | 8/1979 | Nubani et al. | 65/56 |
| 4,344,479 | 8/1982 | Bailey | 165/109.1 |
| 4,451,725 | 5/1984 | Mount | 219/390 |
| 4,480,790 | 11/1984 | Flanagan et al. | 431/168 X |
| 4,561,874 | 12/1985 | Colacello et al. | 65/36 |
| 4,577,340 | 3/1986 | Carlson et al. | 277/80 X |
| 4,596,283 | 6/1986 | Cipriot et al. | 165/1 |
| 4,605,233 | 8/1986 | Sato | 277/135 |

FOREIGN PATENT DOCUMENTS

| | | | |
|---|---|---|---|
| 231271 | 12/1984 | Japan | 277/80 |
| 215864 | 9/1986 | Japan | 277/80 |

Primary Examiner—Larry Jones
Attorney, Agent, or Firm—J. S. Tripoli; D. H. Irlbeck; L. L. Hallacher

[57] ABSTRACT

A ferrofluid seal assembly for providing gas to a rotatable member includes a chamber between the bore of the magnet within the seal and a shaft passing through the bore. Fluid inlet means provides fluid to the chamber. The shaft is hollow from the chamber to one end and communicates with the chamber for providing fluid to a rotable member affixed to the end of the shaft.

2 Claims, 1 Drawing Sheet

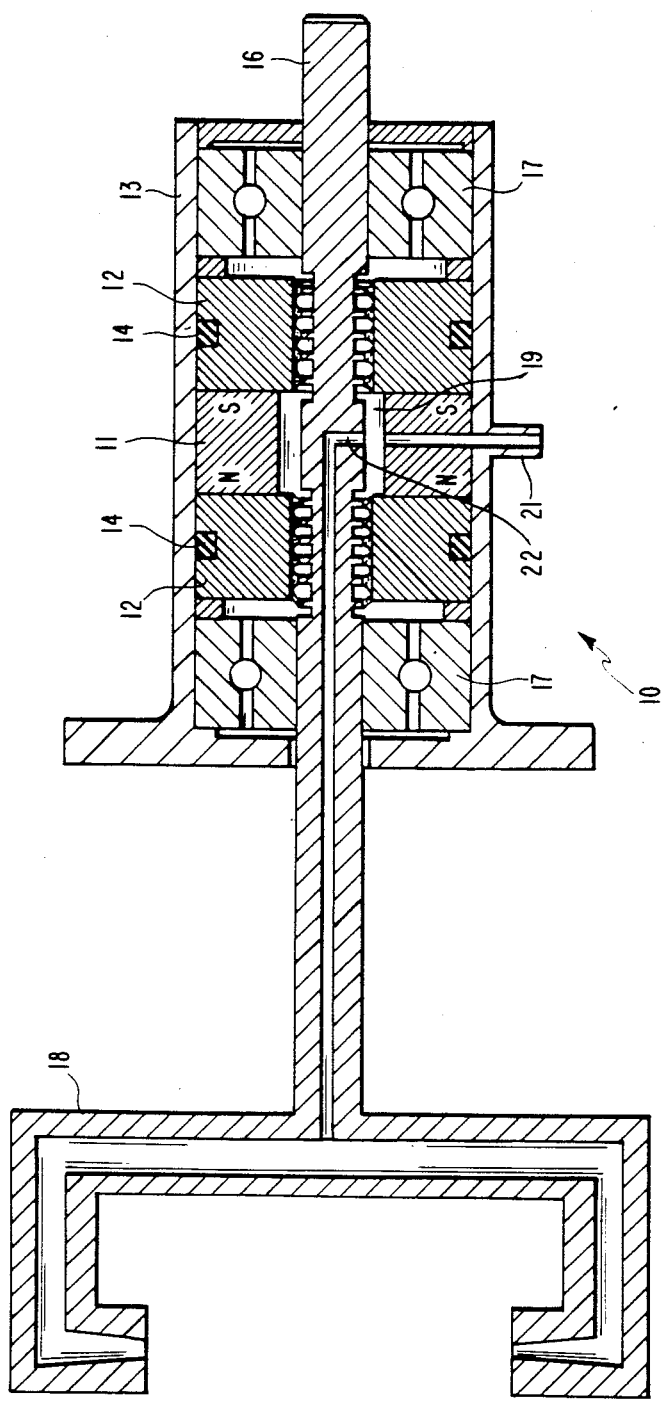

APPARATUS FOR PROVIDING FLUID TO A ROTATABLE MEMBER

BACKGROUND

This invention relates generally to an apparatus for providing fluid to a rotable member and particularly to such an apparatus for providing a flammable gas to a rotating burner.

The production of many commercial items requires the sealing of glass parts. An example of such a part is a color picture tube (kinescope) for a color television receiver. A kinescope includes a neck portion in which electron guns are mounted. The electron guns provide the electron beams needed to generate a color image on the screen of the tube. One of the manufacturing steps of the kinescope is that of mounting and sealing the electron guns into the neck of the tube. Typically, the sealing is done using a rotatable gas burner to heat the glass neck of the kinescope bulb. The heated neck glass molds to a glass support member which supports the electron guns by control electrodes passing through the end of the tube neck. The gas burner is rotated about the neck to heat the neck glass and cause the glass to become malleable and weld to the glass support. The burner is rotated about the neck in order to uniformly heat the neck and the support glass to avoid cracking and deformation of the neck glass. The gas is highly flammable and therefore it is very important that the rotating assembly is leak proof to avoid potentially dangerous situations. Typically, the seals of the rotating assembly used to provide gas to the rotating burner have a very short life and the burner assembly must be taken out of service while the seals are replaced.

Long-lasting, non-mechanical ferrofluid seals are presently available in the art. However, such seals are not presently adaptable to providing flammable gas to a rotating burner. In ferrofluid seals a torroidal magnet is arranged between two ferromagnetic end closures. A shaft is arranged to pass through the centers of the torroidal magnet and the end closures, and is mounted in bearings to rotate within the end closures and the magnet. The shaft is grooved in the areas where it passes through the bores of the end closures to provide small clearances between the shaft and the walls of the bores in the end closures. A ferrofluid is provided in the grooves of the shaft. A magnetic flux path is thereby established through the torroidal magnet, the end closures and the shaft. This magnetic field attracts the ferrofluid into the small clearances between the shaft and the bores of the end closures to form a very effective fluid seal. Because the sealing material is a fluid, it is not subject to wear and the seal has very long life. Such shields are presently available in the art. However, they are not presently adaptable to the provision of a flammable gas to a rotating burner. The present invention provides an adaptation for such use.

SUMMARY

A seal assembly for providing gas to a rotatable member includes a torroidal magnet and a shaft passing through the bore of the magnet and through end closures on both sides of the magnet. A ferrofluid is arranged between the end closures and the shaft to form an effective seal about the shaft. The improvement comprises a chamber between the bore of the magnet and the shaft. A fluid inlet means provides fluid to the chamber. The shaft is hollow from the chamber to one end and includes means to communicate with the chamber and to provide fluid to the one end. A rotatable member is affixed to the one end and receives fluid from the chamber through the shaft.

BRIEF DESCRIPTION OF THE DRAWINGS

The FIGURE is a cross section of a preferred embodiment.

DETAILED DESCRIPTION

In the FIGURE, a ferrofluid seal 10 includes a permanent torroidal magnet 11 held in a housing 13 between annular ferromagnetic end closures 12. The end closures 12 are sealed in the housing 13 by O-rings 14. A rotatable shaft 16 is rotatably supported in the housing 13 by bearings 17. A rotatable member, such as a rotatable burner 18, is affixed to one end of the shaft 16. The torroidal magnet 11 includes a center bore through which the shaft 16 passes. The bore has a diameter which exceeds the diameter of the shaft 1 to provide a chamber 19 around the shaft 16. A fluid inlet 21 communicates with the chamber 19 and is used to provide pressurized fluid to the chamber. The shaft 16 includes a plurality of holes 22 which communicate with the chamber 19. The shaft 16 is hollow from the holes 22 through to the burner 18. The burner 18 therefore receives gas from the inlet 21 through the chamber 19 and the hollow shaft 16. The shaft 16 is rotated by any convenient mechanism which is fastened to the other end of the shaft.

During operation, gas is provided through the inlet 21 to fill the chamber 19. The shaft 16 is rotated and the communications 22 rotate in the gas filled chamber 19, the gas flows into the hollow of the shaft and is fed to the burner 18, which rotates with the shaft, to uniformly heat the glass being sealed.

The invention is advantageous because it provides a long-lasting seal which is operable to seal flammable gas and which is simple in construction and use.

What is claimed is:

1. In a seal assembly for providing gas to a rotatable member, said seal assembly having a seal including a torroidal magnet arranged between annular ferromagnetic end closures, the bores of said enclosures rotatably receiving a shaft having a series of grooves, and a ferrofluid between said end closures and said shaft whereby said end closure, said ferrofluid, said shaft and said magnet form a magnetic flux path to attract said ferrofluid into the spaces between said shaft and said end closures to form an effective seal about said shaft, an improvement comprising a chamber between the bore of said magnet and said shaft, fluid inlet means for providing fluid to said chamber, said shaft being hollow from said chamber to one end and having means communicating with said chamber for providing fluid to said one end, said rotatable member being affixed to said one end for receiving fluid from said chamber.

2. The improvement of claim 1 wherein said fluid is a flammable gas and said rotatable member is a gas burner.

* * * * *